(12) United States Patent
Weneck et al.

(10) Patent No.: US 6,578,667 B2
(45) Date of Patent: Jun. 17, 2003

(54) THRUST REVERSER BLOCKER DOOR ACCESS PLATFORM

(75) Inventors: Thomas R. Weneck, Tucson, AZ (US); Mickey A. Williamson, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/791,442

(22) Filed: Feb. 23, 2001

(65) Prior Publication Data

US 2001/0032906 A1 Oct. 25, 2001

Related U.S. Application Data

(60) Provisional application No. 60/198,916, filed on Apr. 20, 2000.

(51) Int. Cl.[7] .................................................. E04G 7/00
(52) U.S. Cl. .................. 182/178.1; 244/53 R; 244/1 R; 182/123
(58) Field of Search ................................ 244/53 R, 62, 244/1 R; 52/586.1; 108/91, 53.1; 182/123, 83, 178.1, 178.5

(56) References Cited

U.S. PATENT DOCUMENTS

| | | | | |
|---|---|---|---|---|
| 3,636,872 A | * | 1/1972 | Forcier | |
| 3,732,587 A | * | 5/1973 | Fletcher | |
| 3,884,455 A | * | 5/1975 | Weller et al. | |
| 4,123,881 A | * | 11/1978 | Muse | |
| 4,292,783 A | * | 10/1981 | Mulvihill | |
| 4,443,969 A | * | 4/1984 | Hanacek et al. | |
| 4,537,282 A | * | 8/1985 | Lobdell | |
| 4,711,058 A | * | 12/1987 | Patton | |
| 4,990,116 A | * | 2/1991 | Chen | |
| 5,081,946 A | * | 1/1992 | Nannig et al. | |
| 5,295,870 A | * | 3/1994 | Rei et al. | |
| 5,353,455 A | * | 10/1994 | Loving et al. | |
| 5,417,603 A | * | 5/1995 | De Chazal | |
| 5,681,201 A | * | 10/1997 | Choi | |
| 5,725,411 A | * | 3/1998 | Glynn | |
| 6,059,631 A | * | 5/2000 | Maddock | |
| 6,138,792 A | * | 10/2000 | Morris | |

\* cited by examiner

*Primary Examiner*—Tien Dinh
(74) *Attorney, Agent, or Firm*—Conrad O. Gardner

(57) ABSTRACT

An access platform comprising a series of stackable polyurethane foam block assemblies that when properly secured to each other creates a set of steps and handholds similar to a ladder. At the top of the platform a maintenance person can stand on a nonskid surface and perform the work needed at any required height. The ladder is radially curved to fit between the thrust reverser sleeve (deployed) and the inner fan duct wall. This radial diameter between the GE, Rolls Royce and Pratt Whitney engines varies within inches. The main access blocks of the access platform can be used on all three engines by using different foam wedges and wall blocks to secure the assembly tightly in place. Over 70% of the blocks are useable on all three engine types, thus reducing the number of overall parts required. Importantly, a special use tool is provided comprising interlocking foam block modules that are built up in place, are shaped to conform to the engine's inner nacelle wall and are used as a support scaffold for maintenance personnel.

7 Claims, 3 Drawing Sheets

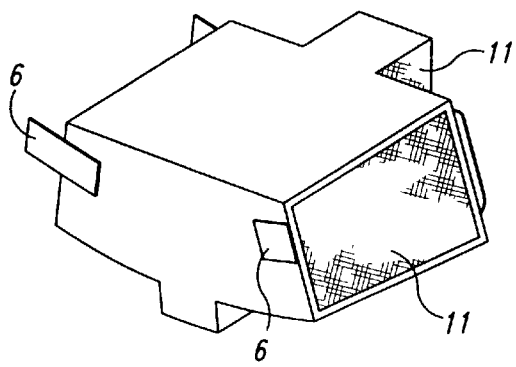
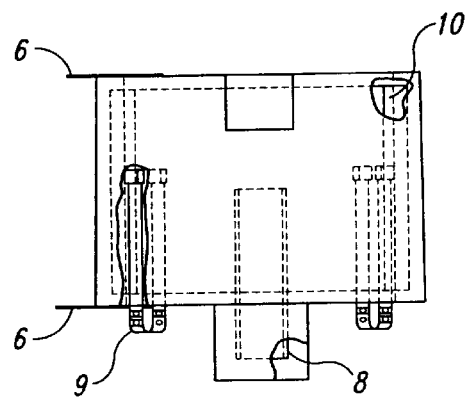
Fig. 2A          Fig. 2B
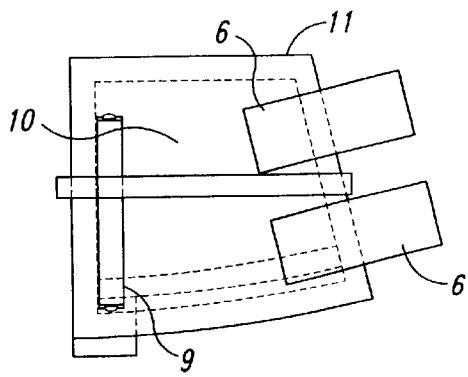
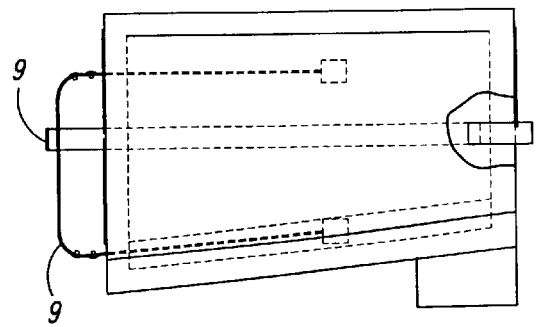
Fig. 3A          Fig. 3B

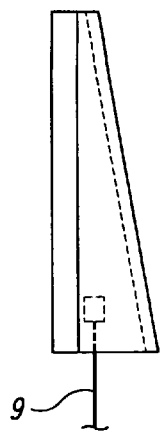 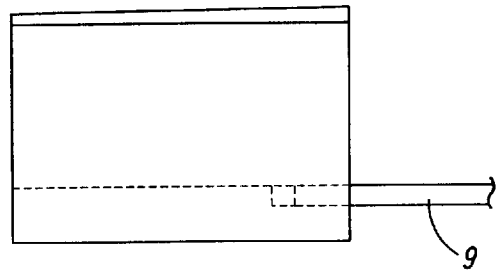
Fig. 4A    Fig. 4B
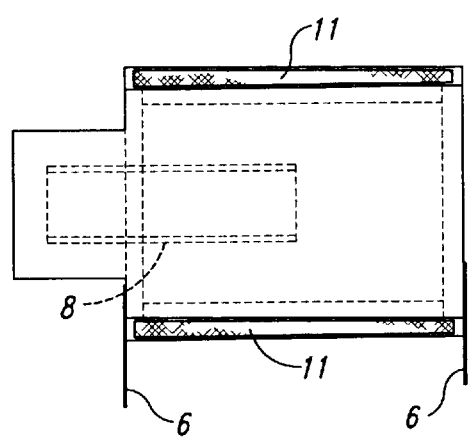 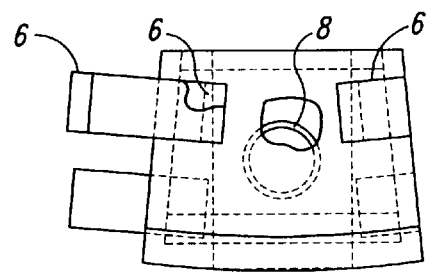
Fig. 5A    Fig. 5B

THRUST REVERSER BLOCKER DOOR ACCESS PLATFORM

CROSS-REFERENCE TO RELATED APPLICATIONS

This application is a conversion of provisional application No. 60/198,916 filed Apr. 20, 2000.

FIELD OF THE INVENTION

The present invention relates to aviation maintenance, repair, and overhaul, and more particularly to access equipment for repair of large engine components including blocker door assemblies.

BACKGROUND OF THE INVENTION

Presently, there is no safe procedure for accessing and removing the upper blocker door assemblies. There have been creative, labor intensive and unsafe methods to gain access to these doors.

A prior method was created for the 747-400 Rolls Royce engine in 1991. This tool was very expensive and was dedicated only to one engine use.

Some include stacking unmounted automobile tires as needed inside the fan duct and climbing up the tires to the location they need to get to. This method is very hazardous and unstable tires can collapse and injure personnel as well as add foreign object debris (FOD) risk to inside of the fan duct.

Another method is to double up heavy 2" by 8" wood boards and secure them to fork lift tines and move the board into the fan duct using a hydraulic fork lift, which has an envelope of around 24" between the outer thrust reverser (T/R) sleeve and inner fan duct wall. This procedure is risky because a mechanic can easily damage composite acoustic paneling with the wood board, introduce FOD, and the mechanic is also taking a safety risk on the board cantilevered out that far to reach the blocker door.

Another method is to totally remove the T/R from the engine and put it in a laydown position on the ground and translate the T/R sleeve open. This may be the safest way but most uneconomical since one has to completely remove the T/R from the engine, perform the repair and then reinstall the T/R, which adds more man hours to perform the job and an increase of actual mechanics to perform the installation/removal process and involves use of extra overhead handling equipment.

BRIEF SUMMARY OF THE INVENTION

Aviation maintenance repair & overhaul organizations need to perform routine checks and sometimes necessary repair in areas that are not conducive to off the shelf, commercially available access equipment such as ladders and scaffolding. There is also the environment of the repair area to consider since many areas pose potential fall hazards and sometimes expensive damage to composite structure, fabrics (interiors), and electrical equipment. There are times when special access equipment must be designed to perform these repair tasks in these confined and load critical areas.

Access to all replaceable components (i.e., blocker doors, door links, acoustic wedge panels between blocker doors) on the large engines of the 777, which include GE, Pratt Whitney and Rolls Royce, has become more difficult due to the larger overall diameter growth of these engines. The 777 thrust reverser (T/R) design uses blocker doors that flip out and deflect thrust forward when the T/R is deployed during landing. These doors are stationed radially inside the fan duct and access to them for removal is difficult especially for the upper half. The highest door is about 13 feet off the ground and one has to go inside the fan duct about 4 feet to get to the door for access to the hinges.

Accordingly, it is an object of the present invention to provide a T/R blocker door access platform tool whick allows a mechanic to gain access to any door needed for removal and installation in a safe manner. The fan duct's acoustic composite paneling is easily susceptable to foreign object damage (FOD) and marring from sharp edges of conventional ladders.

The hereinafter described access platform is made of polyurethane foam blocks which resist FOD being picked up by it such as gravel, metal shavings, etc., and is lightweight by incorporating a styrofoam core, since a single person must get inside the fan duct, which is a confined space and assemble the platform themselves to scale up on.

BRIEF DESCRIPTION OF THE SEVERAL VIEWS OF THE DRAWING

FIG. 2A is a three dimensional view of the main access block of FIG. 1;

FIG. 2B is a sectional view of the main access block of FIG. 2A;

FIGS. 3A and 3B are two views of the ½ step clock showing nylon strap helping operator support;

FIGS. 4A and 4B are views illustrative of wedge blocks utilized to fill in the space between main access blocks and the inner fan duct wall; and, FIGS. 5A and 5B are illustrative of a spacer block assembly utilized on General Electric (GE) series engines.

DETAILED DESCRIPTION OF THE INVENTION

Figure 1:
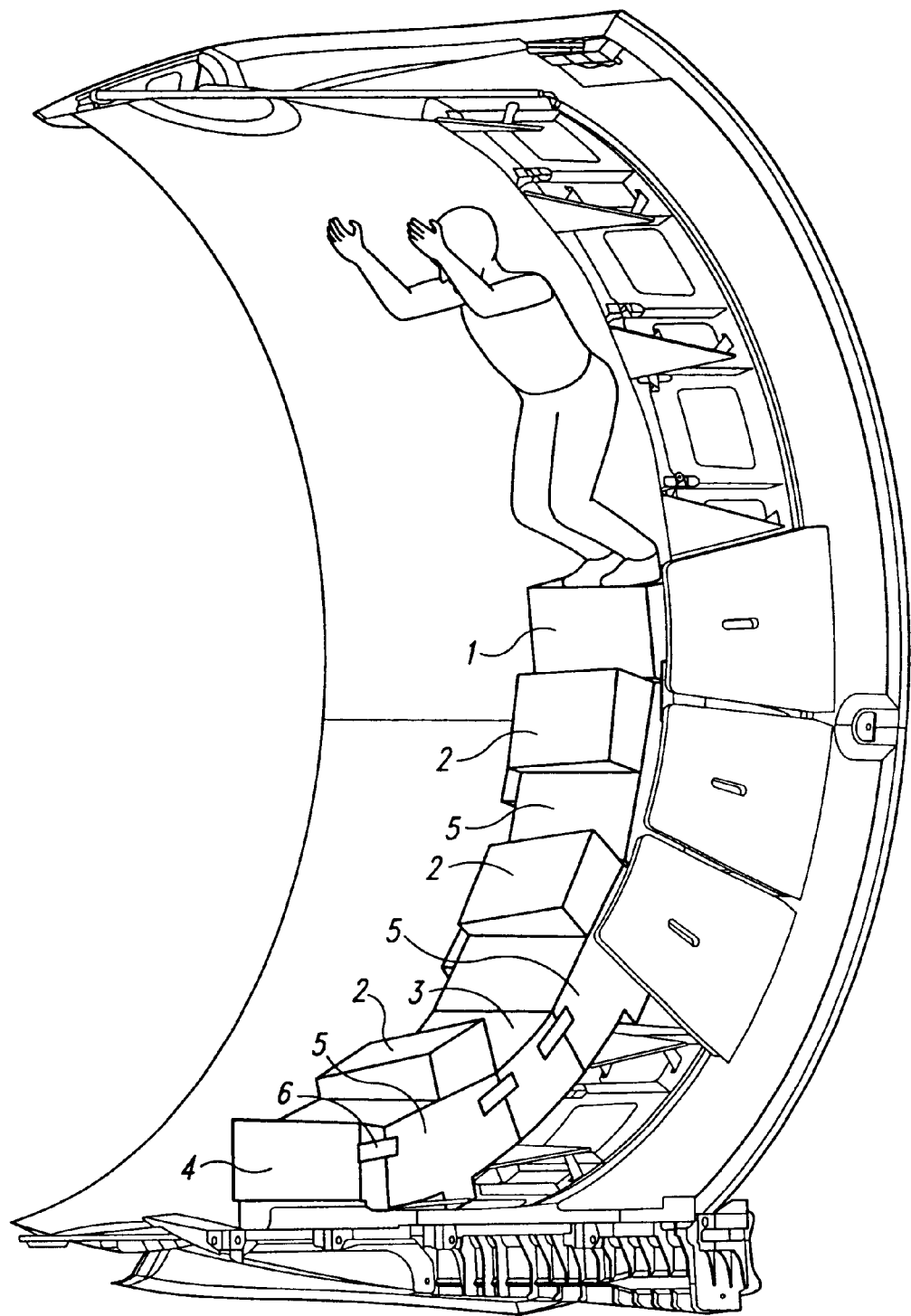
FIG. 1 is a perspective view of the present access platform installed within a thrust reverser.

The access platform consists of a series of stackable polyurethane foam block assemblies that when properly secured to each other create a set of steps and hand holds similar to a ladder. Once after climbing up the side to the top of the platform the mechanic can stand on a nonskid surface and perform the work needed at any required height. This ladder is radially curved to fit between the thrust reverser sleeve (deployed) and the inner fan duct wall. This radial diameter between the GE, Rolls Royce and Pratt Whitney engines varies within inches. The main access blocks of the access platform can be used on all three engines by using different foam wedges and wall blocks to secure the assembly tightly in place. Over 70% of the blocks are useable on all three engine brands, thus reducing the number of overall parts required.

FIG. 1 shows the platform installed within the T/R and at its fullest reach (to the top of T/R). There are 5 main block assemblies for the construction of the the assembled tool. Block assembly 1 is made from ½ half of block assembly 5 for either the left or right side of the engine wall. Block assembly 1 has a top non skid surface surface to protect the mechanic from slipping and causing injury. Block assembly 2 is placed on block assembly 5 and wedged into the engine to act as a step. Block assembly 3 acts as an intermediate space block to form the required curvature of the engine diameter and has no non skid feature, but has an internal strofoam filler core to eliminate pad weight and provide internal structual integrity. Block assembly 4 provides the bottom support for the entire tool and does not contain an internal filler core or non skid element. Block assembly 5 is the universal unit to all three enine types, Rolls Royce, General Electric and Pratt and Whitney. Block assembly 5 has a bottom interlock to the engine to provide stability and an outer protusion that provides a stepping mechanism for the mechanic to climb to the top of the tool. Block assembly 5 contains a inner styrofoam core and a top non skid surface for intermediate height operation of required work. A high density loop (e.g., Velcro™) is attached to a hook (e.g., 3M™ duolock hook). The hook is an integral part of all blocks and is permanently bonded to all blocks, front and rear, except block 2 which is not required. Block 6 then becomes a sacrificial part that can be replaced without replacing blocks that have been repeatedly assembled and disassembled that would otherwise destroy conventional Velcro applications.

A benefit of the present design is that the foam block assembliers are resistant to many fluids that are present in maintenance areas such as oil, Skydrol, solvents, and resists picking up FOD in the form of metal shavings, gravel, etc. The foam is flexible enough to be placed inside an area, such as the acoustic composite paneling of the fan duct, which must not be scratched or scored by hard materials.

Overall, the present design supports the personnel rigidly when on top of the access platform, safe access into the area is increased, is resistant to all maintenance fluids, and the design is protective of the surrounding acoustic structure.

FIG. 2 shows the main access block 5 of FIG. 1 made of inner styrofoam core element (10 with a 4.0 diameter cardboard tube element 8 bonded to it to give support to the 6" wide foot pad. Four 1.0" wide nylon straps element 9 are anchored within the styrofoam core element 10 with small wood blocks or other material that the polyurethane will adhere to. The nylon straps are joined together to create two nylon rungs for holding on to the blocks. The outer surface of the blocks have nonskid pads elements 11 (i.e., 3M #610) at the top and bottom for standing on and at the foot pad area. This gives sure footing in a slippery environment. The outside of the block has six areas to which a 3.0" wide hook pad element 6 of FIG. 1 is bonded to the block with an adhesive (e.g., Atacs adhesive, part number 5103 or 5104). This allows replacement of the loop side of the Velcro strap since that side will wear and reduce holding ability over time.

The ½ step block of FIG. 3 is identical to the main block of FIG. 2, but cut down the center. This allows the mechanic to reach the highest door in the T/R. This block also has an additional 36" long nylon strap bonded to the styro core to help mechanics support themselves while descending the top of the assembly. This block has the nonskid surface (e.g., 3M #610) at the top surface of the block where the mechanic can stand.

The wedge blocks (shown in FIGS. 4A and 4B) are designed to fill in the space between the main access blocks and the inner fan duct wall. This prevents the main access block from moving backward since the block is trapped inside T/R door cavity and the fan duct inner wall. This wedge block consists of all polyurethane foam. There are two different sets of wedges of different types for different engines. One set is utilized with Rolls Royce and Pratt Whitney engines, and the other set is used for GE engines.

The spacer block assembly shown in FIGS. 5A and 5B is used only for the GE series engine. It provides the spacer needed in the GE engine since it has the largest diameter. The block has a styrofoam core and a 4.0" bonded cardboard tube in the core similar to the main access block hereinbefore described, and a nonskid foot pad on standing surfaces and hook pads.

The above described interlocking polyurethane blocks can be further utilized in various structures, e.g., scaffolding, ladder-like structures, retaining walls, and temporary structures. The present lightweight interlocking blocks may be utilized advanatageously to rapidly build what are in essence prefabricated structures.

What is claimed is:

1. A thrust reverser blocker door access platform comprising:

a ladder including a series of stackable polyurethane foam block assemblies secured to each other for providing a set of steps and handholds;

said ladder radially curved and disposed between the deployed thrust reverser of an aircraft engine and the inner fan duct wall of the aircraft engine.

2. The invention according to claim 1 wherein said series of stackable thrust reverser blocker door access platform comprising:

a ladder including a series of stackable polyurethane foam block assemblies secured to each other for providing a set of steps and handholds;

said ladder radially curved and disposed between the deployed thrust reverser of an aircraft engine and the inner fan duct wall of the aircraft engine.

3. The invention according to claim 1 wherein said series of stackable polyurethane foam block assemblies, includes a ½-step block having a cut down the center of said ½-step block thereby enabling an operator to reach the highest door in the thrust reverser.

4. An access platform for repair of large aircraft engine components comprising in combination:

a series of stackable polyurethane foam block assemblies secured to each other for providing a series of steps and handholds;

said series of stackable polyurethane foam block assemblies including a main access block having an inner styrofoam core element with a tube element bonded to said inner styrofoam core element;

said main access block having a plurality of nylon straps anchored within the styrofoam core element; and said plurality of nylon straps joined together to provide two nylon rungs.

5. The invention according to claim 4 wherein said series of stackable polyurethane block assemblies have top and bottom outer surfaces including nonskid pads for mechanic standing positions.

6. The invention of claim 4 wherein said main access block has six areas to which hook pad elements are bonded.

7. The invention according to claim 4 wherein said main access block includes a bottom interlock to the aircraft engine for providing stability and an outer protrusion comprising a stepping mechanism for mechanic ascent to the top of said access platform.

* * * * *